United States Patent
Lammers (10) Patent No.: US 8,700,283 B2
(45) Date of Patent: Apr. 15, 2014

(54) MINING TRUCK AND REGENERATIVE BRAKING STRATEGY THEREFOR

(75) Inventor: Bryan G. Lammers, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 14 days.

(21) Appl. No.: 13/328,380

(22) Filed: Dec. 16, 2011

(65) Prior Publication Data

US 2013/0158827 A1      Jun. 20, 2013

(51) Int. Cl.
*G06F 7/00*      (2006.01)
*B60L 7/10*      (2006.01)

(52) U.S. Cl.
USPC .......................................................... 701/70

(58) Field of Classification Search
USPC ................. 701/70, 78–79; 290/45; 191/33, 2; 307/9.1; 303/152
See application file for complete search history.

(56) References Cited

U.S. PATENT DOCUMENTS

| | | |
|---|---|---|
| 4,453,113 A | 6/1984 | Merlino et al. |
| 5,351,775 A | 10/1994 | Johnston et al. |
| 7,011,029 B2 | 3/2006 | Tidmarsh |
| 7,061,131 B2 | 6/2006 | King et al. |
| 7,669,534 B2 | 3/2010 | Kumar et al. |
| 2004/0251691 A1* | 12/2004 | King et al. ................... 290/40 C |
| 2008/0100129 A1 | 5/2008 | Lubbers |
| 2009/0177335 A1 | 7/2009 | Young et al. |
| 2010/0025167 A1 | 2/2010 | Staub et al. |
| 2010/0039054 A1 | 2/2010 | Young et al. |
| 2011/0094841 A1 | 4/2011 | Mazumdar et al. |

FOREIGN PATENT DOCUMENTS

| | | |
|---|---|---|
| WO | 2010043967 | 4/2010 |
| WO | 2010121707 | 10/2010 |

* cited by examiner

*Primary Examiner* — Yonel Beaulieu
(74) *Attorney, Agent, or Firm* — Liell & McNeil (57) ABSTRACT

Operating a trolley assist-capable mining truck having a regenerative braking mechanism and a friction braking mechanism includes receiving data indicative of a change in demand in an electrical power grid for regenerated electrical power from the mining truck, and commanding braking the mining truck such that application of the retarding torque is allocated to the regenerative braking mechanism in a manner responsive to the data. A mining truck and methodology relating to harvesting electrical power regenerated via application of retarding torque is also disclosed.

7 Claims, 6 Drawing Sheets

MINING TRUCK AND REGENERATIVE BRAKING STRATEGY THEREFOR

TECHNICAL FIELD

The present disclosure relates generally to regenerative braking in a mining truck, and relates more particularly to regeneratively braking the mining truck responsive to an electrical power demand in an electrical power grid.

BACKGROUND

The large scale mining of materials tends to be an energy intensive endeavor. In many opencast mines, a fleet of large mining trucks may operate almost continuously to transport ore and/or overburden from an extraction area to a dump or processing site. Many such mining trucks are operated via diesel-powered engines. Both direct drive diesel engines and diesel-electrical drive systems have been used over the years. As with many other heavy equipment systems, fuel costs for mining trucks can be substantial. Moreover, many mines are located in remote locations, and the costs of transporting fuel to the mine site can add significantly to the operational expense. Even obtaining sufficient fuel supplies can be challenging, regardless of cost. For these and other reasons, engineers in the mining industry and mining equipment manufacturers are continually searching for ways to reduce fuel consumption. Given the historical price volatility of commodities, of which mined materials and petroleum fuels are both examples, as well as variation in geology and topography among mine sites, the economics of supplying and consuming energy for mining activities tends to be complex and variable.

For decades mine operators have experimented with the use of electrical power generated on-site or supplied from a utility grid, to power mining equipment. On-site electrical power generation has similar cost and availability concerns to fueling equipment directly via petroleum fuels. Due to the remoteness of many mines and other factors, supplying electrical power from a grid, even over relatively long distances, has proven consistently advantageous for at least certain mines as compared to reliance on petroleum fuels alone. Electrical power costs can nevertheless vary due to market fluctuations, as well as varying from mine to mine depending upon regional availability of fossil fuels, geothermal or hydroelectrical power, or other native or obtainable sources of energy for electricity generation. Thus, even where electrical powering of mining equipment is viable, there remains ample motivation to use it as efficiently as possible, both to control costs and optimize predictability in the face of uncertain economics.

While first proposed decades ago, one contemporary example of the use of electrical power at mine sites is a trolley system having an overhead trolley line to provide electrical power to assist mining trucks, particularly when traveling loaded upon uphill grades. Many opencast mines include a haul road extending from an extraction site for ore to a remote dump site or processing location. The mining trucks used at such sites may need to travel an uphill grade on the haul road that is several kilometers long, or possibly even longer. It will be appreciated that the use of diesel or other petroleum fuels to propel mining trucks carrying literally hundreds of tons of ore up such grades can be quite costly, and thus trolley systems have received renewed interest in recent years.

In addition to drawing power from an overhead trolley line, many different strategies have been proposed for capturing energy used in retarding mining trucks. In particular, certain mining trucks are equipped with onboard energy storage, such that electrical energy regenerated during braking the vehicle can be stored for later use. U.S. Pat. No. 5,351,775 to Johnston et al. is directed to an apparatus and methodology for powering and controlling diesel-electrical off-road haulers, in which hauler drive wheels are propelled and retarded by DC motors. Johnston et al. propose the use of thyristor-type converters to supply current generated by wheel motors in a retarding mode to make possible the use of the electrical power to replace load requirements on a diesel engine of the vehicle. It appears that the strategy proposed by Johnston et al. might be applicable to instances where the diesel engine is ordinarily driven to provide power for loads on the vehicle which cannot otherwise be accommodated by power from a trolley line. Still other strategies propose storing electrical energy on-board, and transferring excess electrical energy to a power grid once on-board energy storage devices are fully charged. There are various disadvantages associated with known regeneration and power distribution strategies.

SUMMARY

In one aspect, a method of operating a trolley assist-capable mining truck having a regenerative braking mechanism and a friction braking mechanism each configured to apply a retarding torque to ground engaging wheels of the mining truck is provided. The method includes receiving data indicative of a change in demand in an electrical power grid for regenerated electrical power from the mining truck, the electrical power grid including an overhead trolley line coinciding with a haul road extending between a loading site and a dumping site. The method further includes commanding braking the mining truck such that application of the retarding torque is allocated to the regenerative braking mechanism in a manner which is responsive to the data.

In another aspect, a trolley assist-capable mining truck includes a frame, a plurality of ground engaging wheels coupled to the frame, and a braking system coupled with the plurality of ground engaging wheels. The braking system includes a friction braking mechanism and a regenerative braking mechanism. The mining truck further includes a line connecting mechanism configured to couple the regenerative braking mechanism with an overhead trolley line of an electrical power grid. The mining truck still further includes an electronic control unit in control communication with the braking system, and being configured to receive data indicative of a change in demand for regenerated electrical power in the electrical power grid. The electronic control unit is further configured to command braking the mining truck such that application of a retarding torque on the ground engaging wheels is allocated to the regenerative braking mechanism in a manner which is responsive to the data.

In still another aspect, a method of controlling a distribution of electrical power in a power grid having an overhead trolley line coinciding with a haul road, where the overhead trolley line is configured to electrically connect with a plurality of mining trucks each having a friction braking mechanism and a regenerative braking mechanism, is provided. The method includes receiving data indicative of a change in demand for electrical power in the power grid, and allocating application of a retarding torque on ground engaging wheels of at least one of the mining trucks to the corresponding regenerative braking mechanism, responsive to the data. The method further includes harvesting electrical power regenerated via application of the retarding torque.

DETAILED DESCRIPTION

Figure 1:
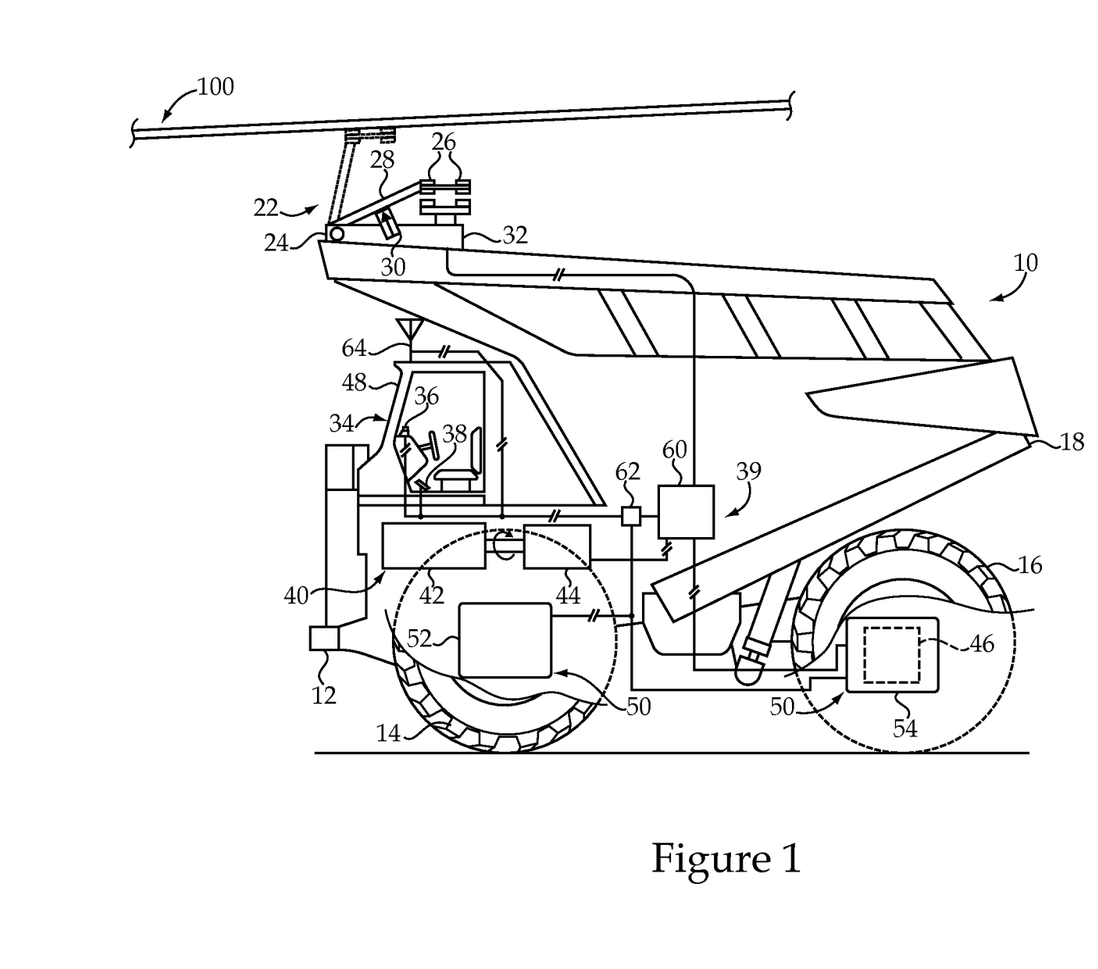
FIG. 1 is a side diagrammatic view of a mining truck, according to one embodiment.

Referring to FIG. 1, there is shown a trolley-assist capable mining truck 10 according to one embodiment. Mining truck may include a frame 12 having a front set of ground engaging wheels 14 and a back set of ground engaging wheels 16, coupled with frame 12. In the illustrated embodiment, a set of two front wheels 14 configured for steering truck 10 are provided, and a set of two pairs of back wheels 16 on a single axle for propelling truck 10, although the present disclosure is not thereby limited. A bed 18 is coupled with frame 12, and may be tilted between a lowered position, as shown, and a lifted position, to dump material from bed 18 in a conventional manner. Mining truck 10 may further include a propulsion system 39, of which ground engaging wheels 14 and/or 16 may be a part, system 39 including a drivetrain 40 having a combustion engine 42 and a generator 44 powered via combustion engine 42. In a practical implementation strategy, combustion engine 42 may include an internal combustion engine such as a compression ignition diesel engine, but in other embodiments might include a gas turbine engine. Propulsion system 39 may further include one or more electrical propulsion motors 46 coupled with back wheels 16. Propulsion system 39 may further include a line connecting mechanism 22 mounted to frame 12, or bed 18 as shown, configured to electrically connect with an overhead trolley line 100.

As noted above, truck 10 may be trolley-assist capable. Those skilled in the art will be familiar with mining trucks configured to operate via electrical power from an overhead trolley line in certain instances. In one practical implementation strategy, truck 10 may transition between an on-trolley mode where propulsion system 39 is receiving power entirely or partly from overhead trolley line 100, and an off-trolley mode where power is received entirely from engine 42 and generator 44 and/or from an on-board energy storage device (not shown). Embodiments are also contemplated in which a blend of electrical power from trolley line 100 and engine 42/generator 44 is used in the on-trolley mode, or where mechanical power is provided from engine 22 to ground engaging elements 16 and/or 14 in either mode. As will be further apparent from the following description, truck 10 may also operate to feed regenerated electrical power into trolley line 100 when connected therewith. Propulsion system 39 may also include power electronics 60, otherwise known as a DC link, enabling the various electrical connections between and among components of truck 10, and between truck 10 and trolley line 100 for purposes of receiving power from or feeding power to trolley line 100, as further described herein.

A cab 48 may be mounted to frame 12, and an operator control station 34 positioned within cab 48. Operator control station 34 may include a variety of operator input devices for controlling and monitoring operation of truck 10. Among these may be an enable switch 36, such as a push-button switch, control lever or other operator manipulable mechanism, which enables an operator to adjust truck 10 between a manual braking mode where an operator determines the manner in which truck 10 is braked, and an automated mode, in which braking of truck 10 is autonomously controlled, for purposes and in a manner further discussed herein. A brake pedal 38 may also be positioned at operator control station 34, for manually braking truck 10.

In one embodiment, line connecting mechanism 22 may include a pantograph 24 having a linkage 28 coupled with a base 32. Pantograph 24 may be adjustable by way of an actuating mechanism 30 between an on-trolley configuration for contacting trolley line 100, and a rest configuration approximately as shown in FIG. 1. In the rest configuration, linkage 28 may be in a lowered position, such that electrical contactors 26 mounted to linkage 28 do not contact trolley line 100, whereas in the on-trolley configuration linkage 28 may be raised such that electrical contactors 26 electrically connect with trolley line 100. An actuating mechanism 30, including for instance a hydraulic actuator, a pneumatic actuator, or an electrical actuator, may be coupled with linkage 28 to controllably adjust pantograph 24 between the respective configurations. Electrical contactors 26 may be coupled with DC link 60 to enable electrical power to be supplied from trolley line 100 to propulsion system 39, or fed from system 39 to trolley line 100 as further discussed herein.

Truck 10 may further include a braking system 50 coupled with ground engaging wheels 14 and 16. Braking system 50 may include a front friction braking mechanism or subsystem 52 and a back friction braking mechanism or subsystem 54. Braking system 50 may further include a regenerative braking mechanism. In the illustrated embodiment, the regenerative braking mechanism includes the one or more electrical motors 46. Electrical motor(s) 46 may include electrical wheel motors, such that one electrical motor is coupled with each of the two sets of two back wheels 16. In other embodiments, a single electrical propulsion motor might be used, coupled with the back axle. It should be further appreciated that, while in truck 10 no direct mechanical linkage between engine 42 and any of the ground engaging wheels is provided, in alternative embodiments such a configuration might be used. Where a direct mechanical linkage between engine 42 and wheels 16 and/or 14 exists, the drivetrain might be used as a regenerative braking mechanism, such that an electrical generator is operated during retarding truck 10 for regenerating electrical power to be fed to an overhead trolley line. In view of the foregoing, it will be appreciated that a variety of different propulsion system architectures are contemplated within the context of the present disclosure. At least one electrical propulsion motor, operable in either of a propulsion mode or a retarding mode, will typically be used. Depending upon the configuration of propulsion system 39, a resistive grid for dissipating excess regenerated electrical power might be used and/or an electrical energy storage subsystem might be provided on-board truck 10. In a practical implementation strategy, however, neither a resistive grid nor on-board storage for regenerated electrical power is necessary. Regenerated electrical power may be fed to trolley line 100, and in contrast to certain interior prior strategies, feeding of the regenerated electrical power may occur based upon a power demand from an electrical power grid of which trolley line 100 is a part.

Controlling regeneration of electrical power during retarding truck 10 may take place in a manner transparent to an operator. To this end, truck 10 may further include a control system 62 coupled with each of front friction braking subsystem 52, back friction braking subsystem 54, motor 46, drivetrain 40, the operator input devices 36 and 38 at control station 34, and DC link 60. Control system 62 may also include or be coupled with an antenna 64. Antenna 64 may be configured to receive data indicative of a change in demand for regenerated electrical power in the electrical power grid of which trolley line 100 is a part. Control system 62, via an electronic control unit further discussed herein, may be configured to command braking mining truck 10 such that application of a retarding torque on ground engaging wheels 16 and/or 14 is allocated to regenerative braking mechanism/motor 46 in a manner which is responsive to the data.

Figure 2:
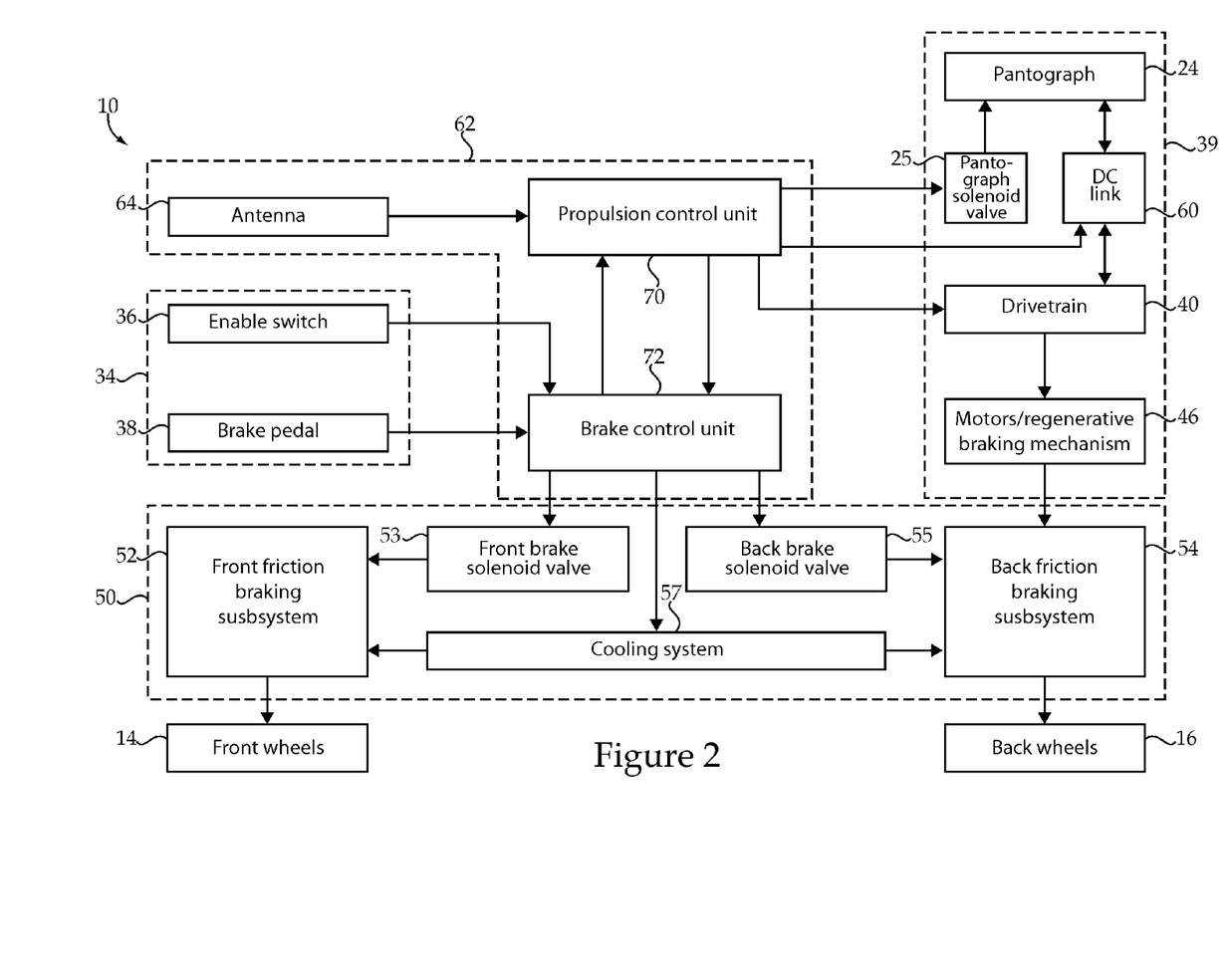
FIG. 2 is a block diagram of control and braking features of the mining truck of FIG. 1.

Referring also now to FIG. 2, there is shown a block diagram of certain of the components of truck 10. As noted above, control system 62 may include an electronic control unit configured to receive the data indicative of a change in demand for regenerated electrical power, and further configured to command braking mining truck 10 responsive to the data. To this end, control system 62 may include a first electronic control unit 70 comprising a propulsion control unit, and a second electronic control unit 72 comprising a brake control unit. Each of control units 70 and 72 may include a data processor, coupled with a computer readable memory storing computer executable code for performing the various control functions described herein. Either of control units 70 and 72 might receive and act upon the subject data, and in a practical implementation strategy, control unit 70 may receive the data via antenna 64, and output braking control commands to motor 46, while control unit 72 may be in communication with control unit 70 and output braking control commands to subsystems 52 and 54. Control unit 70 may also utilize antenna 64 to transmit signals for purposes which will be apparent from the following description. It should be appreciated that any combination of distributed control units in communication with one another may be used, for the purpose of acting upon data and/or control signals to enable mining truck 10 to respond and take advantage of changing conditions at a mine site.

Control unit 70 is also shown in control communication with drivetrain 40, motor 46, and with DC link 60. Control unit 70 may also be in control communication with a pantograph solenoid valve 25. Valve 25 may be adjusted via a signal from control unit 70 such that it controls the supply of hydraulic fluid to actuating mechanism 30 of pantograph 24 from a hydraulic pump, and also controls the return of hydraulic fluid from actuating mechanism 30 to a tank. Control unit 70 may controllably configure DC link 60 appropriately for conveying electrical power to motor 46 from generator 44 and/or pantograph 24, as well as for feeding regenerated electrical power from motor 46 to trolley line 100 via pantograph 24. Control unit 70 may communicate with drivetrain 40 for the purposes of controlling fueling and other parameters of engine 42 such that an output of generator 44 may be modulated as desired to accommodate the needs of system 39.

Brake control unit 72 may be coupled with enable switch 36 and brake pedal 38. Control unit 72 may also be in control communication with a front brake solenoid valve 53 configured to control supply and return of hydraulic fluid to and from front friction braking subsystem 52, and a back brake solenoid valve 55 similarly associated with back friction braking subsystem 54. Front and back friction braking subsystems 52 and 54 may be coupled with front wheels 14 and back wheels 16, respectively. Control unit 72 may also be coupled with a cooling system 57 for hydraulic fluid used to actuate front and back friction braking subsystems 52 and 54, and may interrupt or modify any present braking strategy responsive to a state of cooling system 57, such as a coolant temperature. In one practical implementation strategy, control unit 70 may communicate with control unit 72, such that application of a retarding torque on wheels 14 and/or 16 via mechanisms 52 and 54, and also via motor 46, may be allocated responsive to power demand in the power grid, and more particularly allocated responsive to a change in the power demand. As further discussed herein, control unit 70 may command braking truck 10 responsive to data indicative of an expected change in power demand of the power grid, such that appropriate control commands are sent to valves 53 and 55 and to motor 46, prior to occurrence of the expected change in power demand. This capability enables feed forward control over truck 10, such that changes in power demand in the power grid are proactively accommodated.

Figure 3:
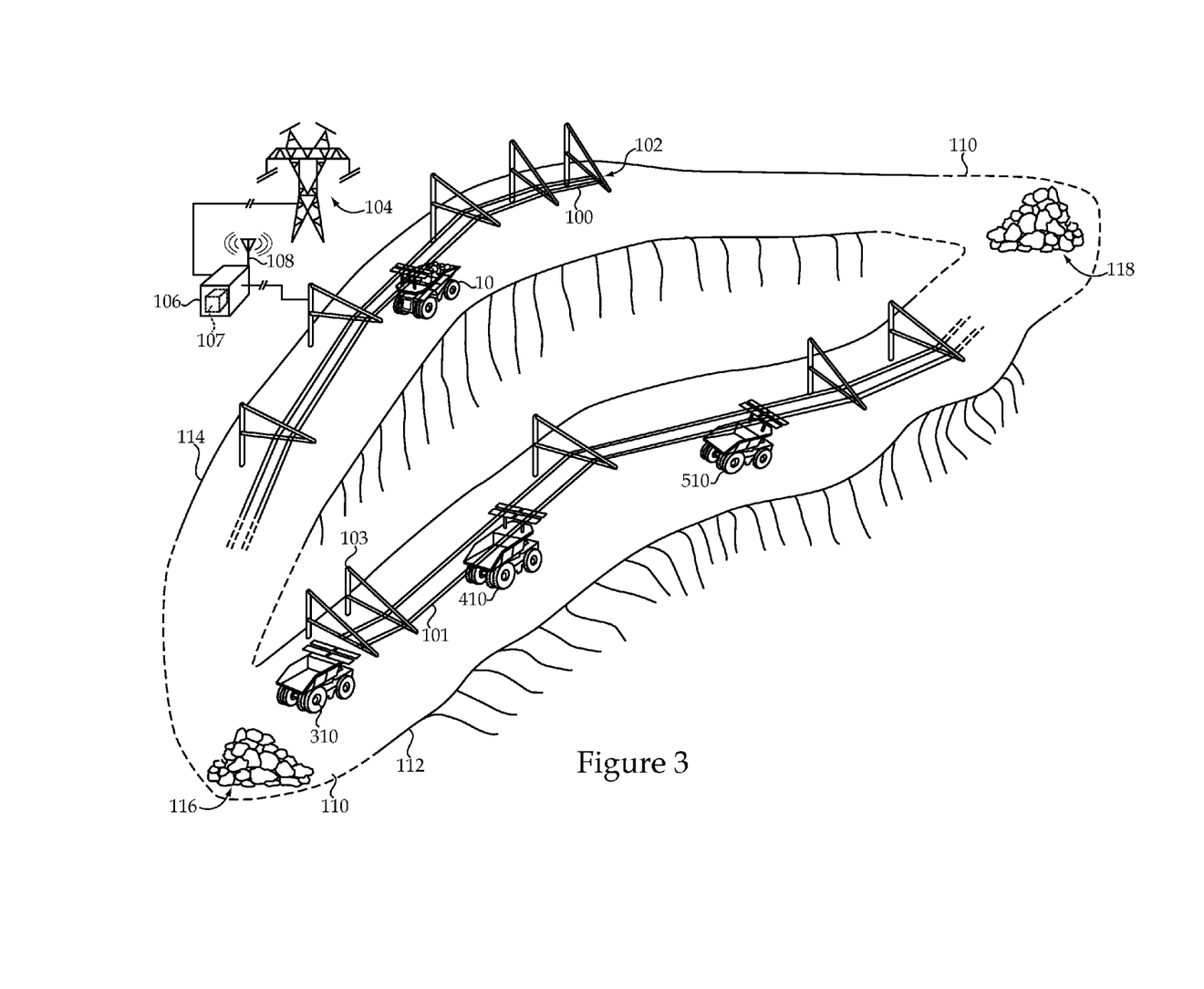
FIG. 3 is a diagrammatic view of a fleet of mining trucks in a trolley-assisted mine environment.

Turning now also to FIG. 3, there are shown a plurality of mining trucks in a trolley-assisted mine environment. Trolley line 100 may be a trolley line segment of a local electrical power grid 102, where the subject trolley line segment coincides with a downhill section 114 of a haul road 110. Haul road 110 extends between a loading site 118 and a dump site 116. A plurality of additional trucks 310, 410, and 510, are shown traversing an uphill section 112 of haul road 110. Trucks 410 and 510 are shown connected with another trolley line segment 101 which coincides with uphill section 112, whereas truck 310 is shown as it might appear just prior to connecting with trolley line segment 101. Trolley line segments 100 and 101 may be supported on poles 103 in a conventional manner. Also shown in FIG. 3 is an electrical energy storage subsystem 106 connected with local grid 102 and having an electrical energy storage medium 107. In one practical implementation strategy, medium 107 may include a sodium-nickel chloride based storage medium. While having relatively high efficiency, such storage media may operate optimally at several hundred degrees Fahrenheit. The advantages of locating such storage media off-board of vehicles at a mine site will be readily apparent. An antenna 108 is shown positioned at substation 106 for transmitting and receiving data to and from each of the trucks for purposes further discussed herein, but could be positioned elsewhere at the mine site. A regional electrical power grid 104 may be coupled with local grid 102, for instance via substation 106. Those skilled in the art will appreciate that various other subsystems and substations may be included to enable local grid 102 to receive power from regional grid 104, supply power to regional grid 104, and distribute electrical power about the mine site. Likewise, other subsystems may be positioned electrically between substation 106 and trolley lines 100 and 101, and between local grid 102 and regional grid 104.

In the illustrated embodiment, truck 10 is traversing downhill section 114 of haul road 110 while loaded with material to be dumped at dump site 116. Each of trucks 310, 410 and 510 is in an unloaded state, and thus driving unloaded uphill from dump site 116 to loading site 118. In other mining environments, trucks may travel loaded uphill and unloaded downhill, or the haul road may be such that the sections extending between the loading site and dumping site include both uphill and downhill sections. Each of the mining trucks shown in FIG. 3 may be configured with similar hardware and software to enable controllably receiving power from local grid 102 or feeding regenerated electrical power into local grid 102 in a similar manner. To this end, each of trucks 10, 310, 410 and 510 will typically include an antenna for receiving wireless control signals and/or data specific to the mine site, global positioning data, and for transmitting signals to other mine vehicles and/or computers.

In any event, it will be recalled that data received via control system 62 may be indicative of a change in demand for electrical power in a power grid. In FIG. 3, truck 10 may be operating such that a first proportion of a retarding torque applied to wheels 14 and/or 16 is provided by friction braking subsystems 52 and 54, while a second proportion of the retarding torque is applied via motor 46. At the state depicted in FIG. 3, local power grid 102 may have a first demand for electrical power, based at least in part upon the electrical power demand of trucks 410 and 510. When truck 310 connects with trolley line segment 101, the power demand in grid 102 may change. In particular, a magnitude of the power demand may change, typically increasing. Upon or prior to electrically connecting truck 310 with trolley line segment 101, truck 10 may be adjusted such that the proportion of retarding torque applied to wheels 14 and/or 16 via motor 46 is increased and the proportion applied via subsystems 52 and 54 is decreased, thus allowing grid 102 to compensate for the increased demand. As noted above, each of trucks 10, 310, 410 and 510 may be equipped with a position monitoring system such as a global or local positioning system, enabling each truck to communicate and/or determine its location relative to other features of the mine site. Accordingly, just prior to truck 310 electrically connecting with trolley line segment 101, truck 10 may be operated to begin feeding an increased amount of regenerated electrical power into grid 102, and such that upon electrically connecting truck 310 with trolley line segment 101 the increased demand for electrical power is satisfied. In certain instances, control unit 70 may command braking truck 10 such that truck 10 transitions between a first braking mode at which the retarding torque on wheels 14 and/or 16 is applied at least predominantly by friction braking subsystems 52 and 54, and a second braking mode at which the retarding torque is applied at least predominantly by motor 46 operating in its regenerative mode.

In other instances, rather than an increased demand for electrical power relating to electrically connecting a mining truck with grid 102, or a decreased demand relating to electrically disconnecting a mining truck from grid 102, the change in demand may include a change in demand resulting from a desire to feed electrical power to, or receive electrical power from, regional grid 104. In still other instances, the change in demand may be based at least in part upon a charge state of energy storage subsystem 106, or transitioning another piece of equipment at the mine site, such as a rope shovel or drag line, from a state feeding power into or drawing power from grid 104, to an opposite state. It will thus be appreciated that electrical power regenerated via application of the retarding torque on wheels of truck 10, or any of the other trucks, may be harvested to charge storage medium 107, to feed power into regional grid 104, or for various other purposes.

Figure 4:
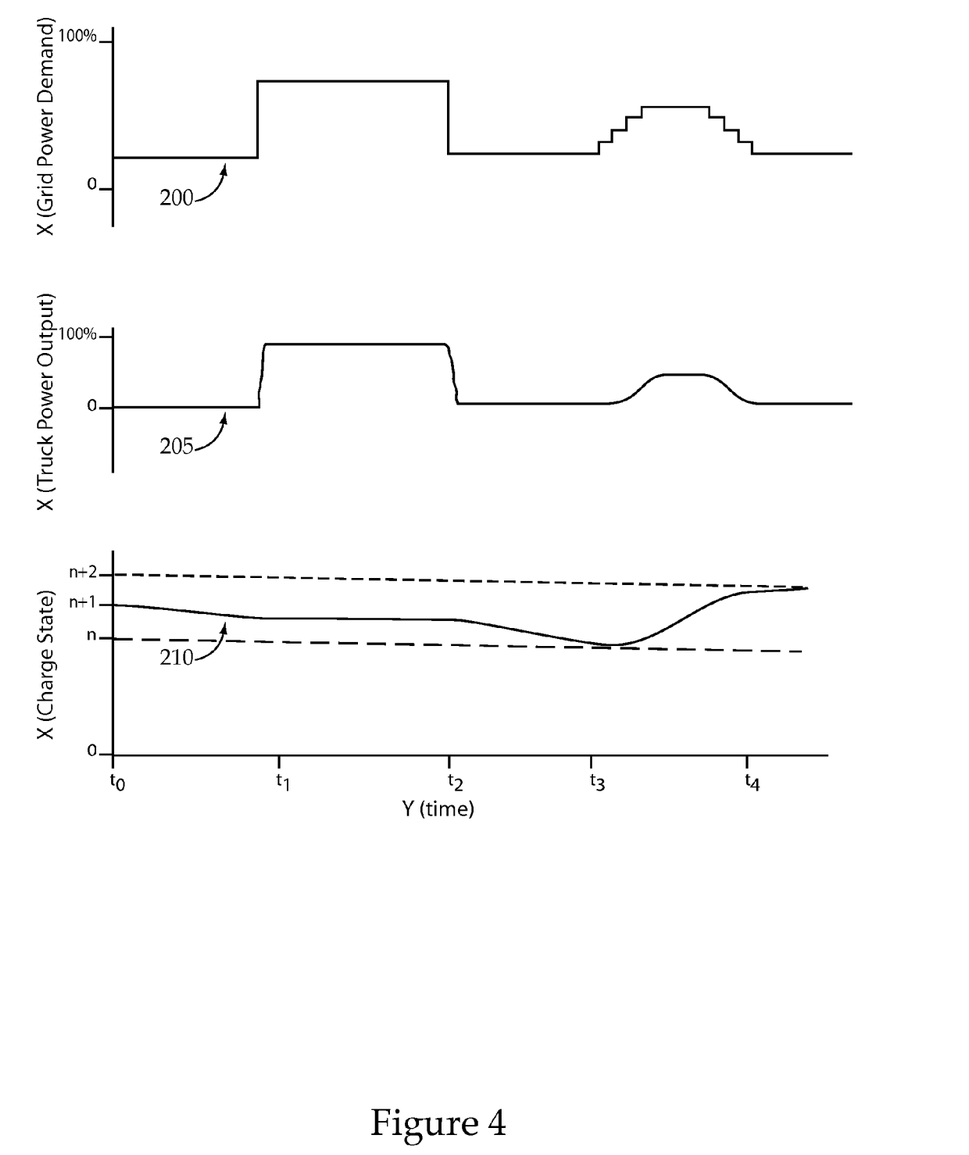
FIG. 4 is a graph illustrating power demand, output, and energy storage, for several features in a trolley-assisted mine environment.

Referring now to FIG. 4, there is shown a graph illustrating a first signal 200 which is representative of a demand for electrical power in grid 102, a second signal 205 which is representative of a regenerated electrical power output of truck 10, and a third signal 210 representative of a charge state of storage media 107. In FIG. 4, the Y-axis indicates time, whereas the X-axis, separately in relation to each of the three signals, indicates signal value. It may be noted that at a time $T_1$, signal 200 increases, representing an increased power demand in grid 102. Signal 200 decreases at a subsequent time $T_2$, then incrementally begins increasing at another time $T_3$, and then incrementally decreases as yet another time $T_4$ approaches. In FIG. 4, the increased power demand from time $T_1$ to time $T_2$ might, for instance, be the result of a demand for electrical power in grid 102 which results from an increased demand for electrical power from regional grid 104. Signal 205 shows a corresponding increase in the magnitude of electrical power fed to local grid 102. Accordingly, it will be understood that at time $T_1$ braking may be commanded in truck 10 such that electrical power regenerated via truck 10 is fed to local grid 102 via trolley line 100 in a manner which is commensurate with the change in demand. As used herein, the term "commensurate" means that the power provided is of a magnitude, or otherwise has properties, which are demanded. Another way to understand this principle is that local grid 102 is receiving what it asks for, not just a roughly correlated "on" or "off" condition. A truck which simply begins regenerative braking because it perceives a need for more electrical power in the grid, without consideration of how that power is to be provided, may well not be feeding power commensurate with the change in demand, although such an action might fall within the scope of the present disclosure for other reasons. At time $T_2$, the decreased demand in local grid 102 results in a decreased magnitude of electrical power fed from truck 10 to local grid 102. The ability to provide electrical power in this general manner is contemplated to make feeding power to a regional grid more viable and more valuable than what was possible in earlier strategies. The fed power may have a magnitude or other properties such as phase, noise, rates of increase or decrease, which are precisely tailored to what the regional grid needs. Similar advantages are associated with feeding power into the local grid for local consumption.

In FIG. 4, signal 210 illustrates a charge state of energy storage subsystem 106 which decreases from time $T_0$ to time $T_1$, is substantially unchanged from time $T_1$ to time $T_2$, and then decreases again from time $T_2$ to time $T_3$. During each of time intervals $T_0$ to $T_1$ and $T_2$ to $T_3$ energy storage subsystem 106 may be feeding power into grid 102, which power is consumed via trucks assisted in traveling an uphill grade, for example. In the time interval from $T_1$ to $T_2$, the charge state of energy storage subsystem 106 may be substantially unchanged, either because no trucks are connected with grid 102 for trolley assist, or because no power needs to be drawn from subsystem 106 due to the available regenerated electrical power from truck 10. At about time $T_3$, charge state of subsystem 106 has approached a lower level n, below which it is undesirable to further drain subsystem 106. Accordingly, at time $T_3$, it may be desirable to charge storage media 107, via electrical power regenerated via truck 10. It has been observed that charging and discharging an energy storage medium such as medium 107 advantageously occurs gradually. In other words, rather than sharply stepping up or stepping down electrical power supplied to or drained from storage medium 107, it may be desirable to relatively gradually initiate charging and discharging. To this end, at time $T_3$, the power demand as shown via signal 200 in grid 102 is incrementally increased. In a corresponding manner, regenerated power output of truck 10 is incrementally increased such as by incrementing allocation of the retarding torque to motor 46, and power supplied to substation 106 to charge storage medium 107 is gradually ramped up. As a charge state of medium 107 increases towards a fully charged, or optimally charged state, at n+2, power demand in grid 102 is incrementally decreased, and power output of truck 10 is ramped down.

Figure 5:
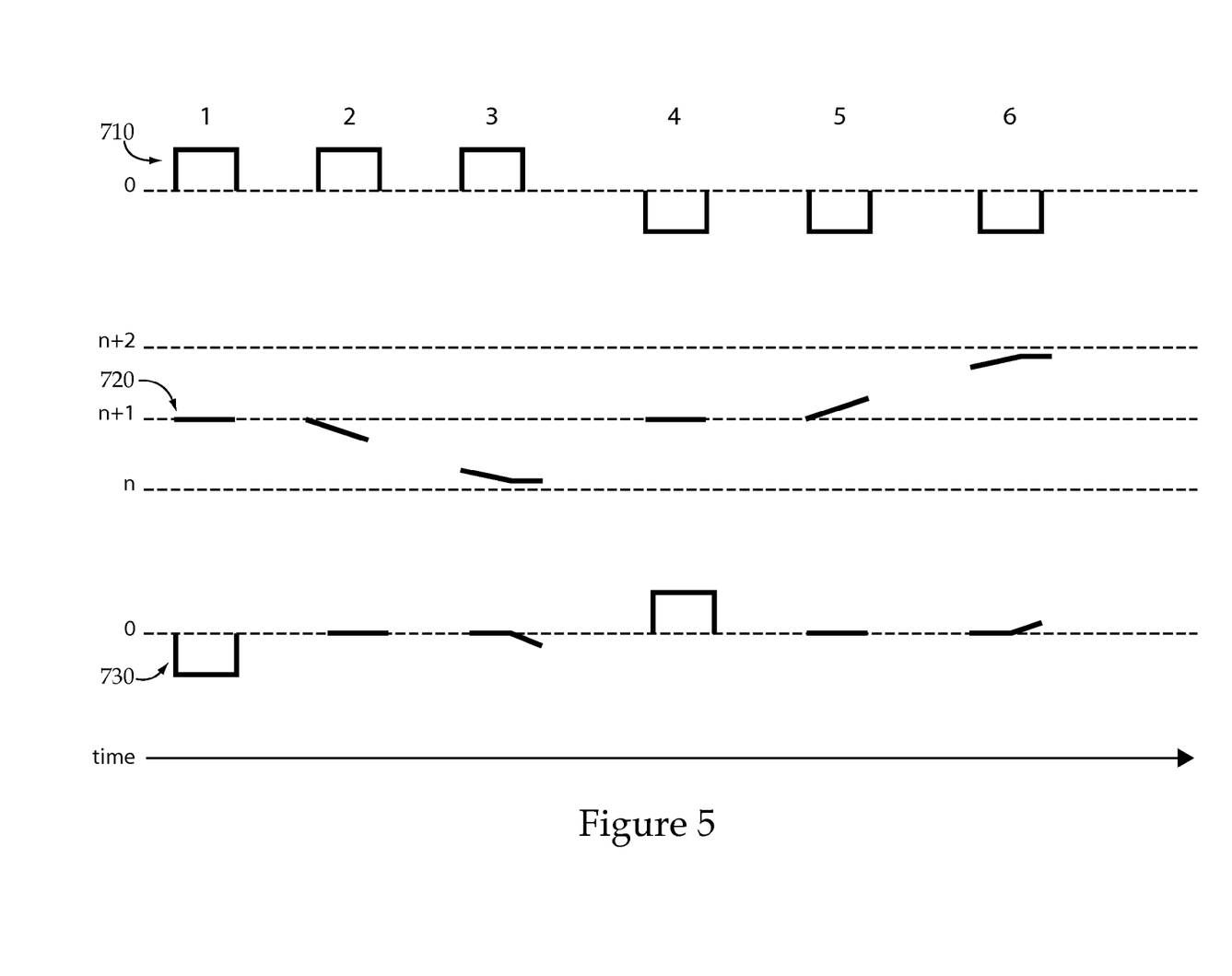
FIG. 5 is a chart illustrating power demand, storage and grid state, for a plurality of different operating conditions, in a trolley-assisted mine environment.

Referring now to FIG. 5, there is shown a chart alternatively and additionally illustrating various effects of power demand and power regeneration, at a mine site. In FIG. 5, columns 1-6 illustrate a plurality of different conditions in a trolley-assisted mine environment. In particular, a first signal 710 represents a state of power transfer between a mining truck and a trolley line, a second signal 720 represents a state of power transfer between an energy storage medium and the trolley line, and a third signal 730 represents a state of power transfer between the trolley line and a regional grid. In connection with FIG. 5, "trolley line" refers generally to the trolley-assist line segments, not necessarily a specific one. In the first condition shown in column 1, all power is being drawn from the regional grid, as might be expected where the mining truck is electrically powered from the trolley line, which in turn receives electrical power from the regional grid, and a state of the energy storage medium is unchanged. In column 2, no power is being drawn from the regional grid, and is instead being supplied to the mining truck from the energy storage medium. In column 3, the mining truck receives power from the trolley line, which is initially supplied from the energy storage medium, but as the charge state of the storage medium approaches a lower limit n, power draw from the energy storage medium and power draw from the regional grid are modulated such that the charge state of the storage medium asymptotically approaches the lower limit n. In column 4, the mining truck is supplying power into the trolley line, the charge state of the storage medium is unchanged, and all of the power is pushed to the regional grid. In column 5, the mining truck is regenerating, and all of the power is pushed to the storage medium. In column 6, the mining truck is regenerating, and all of the power is initially pushed to the storage medium, but is modulated analogous to the condition in column 3, such that the charge state of the energy storage medium asymptotically approaches a high limit n+2. Those skilled in the art will appreciate that a variety of other combinations than those shown in FIG. 5 may occur from time to time in a real trolley-assisted mine environment.

INDUSTRIAL APPLICABILITY

Figure 6:
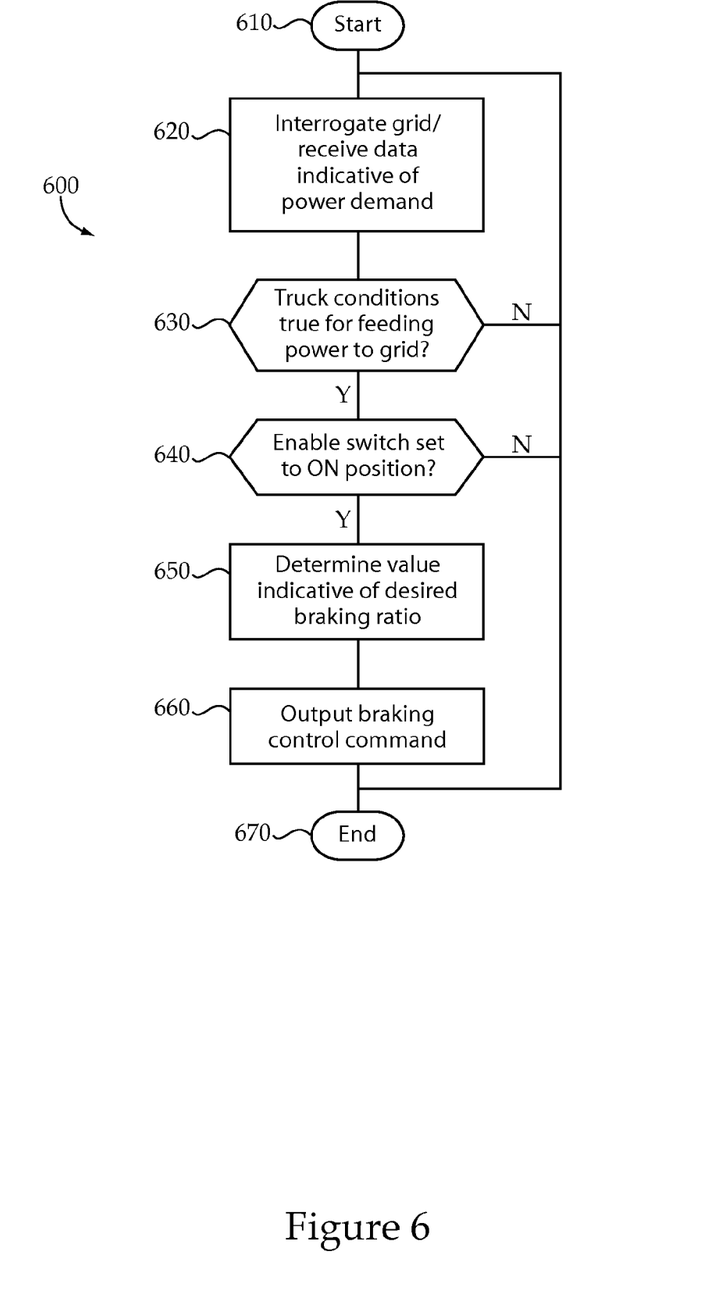
FIG. 6 is a flowchart illustrating an example control process, according to one embodiment.

Referring now to FIG. 6, there is shown an example control process according to the present disclosure by way of a flowchart 600. The process of flowchart 600 may start at step 610, and proceed to step 620 at which control unit 70 may interrogate grid 102, or otherwise receive data indicative of a demand in electrical power grid 102 for regenerated electrical power from mining truck 10. As discussed herein, the demand for regenerated electrical power may be the result of another mining truck electrically connecting with grid 102 in preparation for trolley-assisted travel on an uphill section of a haul road. Alternatively, the demand for regenerated electrical power might be the result of a desire to charge an electrical energy storage subsystem, or a desire to feed electrical power to a regional grid. Step 620 might be executed prior to truck 10 electrically connecting with grid 102, for instance just subsequent to being loaded with material at a loading site. Step 620 might also be executed while truck 10 is electrically connected with trolley line 100 and already traversing a segment of a haul road having a downhill grade, approximately as illustrated in FIG. 3.

From step 620, the process may proceed to step 630 at which control unit 70 may query whether truck conditions are true for feeding power to the grid. Conditions evaluated or determined at step 630 might include, for instance, whether brake pedal 38 is depressed. If the operator is manually braking truck 10, it might be concluded that automated control over braking should be suspended. Other factors considered at 630 might include speed, travel direction, steering, or still other dynamic parameters indicative of whether operating truck 10 in a regenerative braking mode is appropriate. If, at step 630, conditions are not true, the process may return to commence the control routine again, or might simply exit. From step 630, the process may proceed to step 640 at which control unit 70 may query whether enable switch 36 is set to an on position. If no, the process might loop back or exit. If yes, the process may proceed to step 650 at which control unit 70 may determine a value indicative of a desired braking ratio. At step 650, control system 62 may be understood to be determining how much relative braking, that is retarding torque, at any given instance should be applied via friction braking subsystems 52 and 54 versus the retarding torque applied via motor 46.

In many instances, braking system 50 may be configured such that 100% of a retarding torque can be applied via friction braking subsystems 52 and 54, 100% of the retarding toque can be applied via motor 46, or any combination of the two from 0% to 100%. The determined value might thus include a numeric value indicative of the desired ratio. The desired braking ratio may be commensurate with the demand for regenerated electrical power from truck 10, meaning that the desired braking ratio is a ratio calculated or otherwise determined to supply grid 102 with the electrical power it is asking for. From step 650, the process may proceed to step 660 at which control system 62 may output commands to motor 46, and to solenoid valves 53 and 55 to allocate retarding torque on wheels of truck 10 via the desired ratio. As alluded to above, the change in demand may include an expected change. One example might be an expected change corresponding to data indicating that another mining truck is about to connect to grid 102 for trolley-assist. Accordingly truck 310 might output a signal prior to electrically connecting with trolley line segment 101, which is indicative of an expected change in demand, and a braking control command outputted via control system 62 prior to the change actually occurring. In any event, power fed from truck 10 into grid 102 may be harvested, for any of the purposes contemplated herein. From step 660, the process may loop back to execute again, or may end at step 670. It will be recalled that the received data may be indicative of a change in demand for regenerated electrical power. Accordingly, each time the process of flowchart 600 repeats, control system 62 may be receiving data indicative of a changed demand in comparison with the last time the process was executed. This general strategy enables incrementally changing the braking ratio, to ramp up or ramp down feeding of electrical power from truck 10 into grid 102, as the case may be.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:
1. A trolley assist-capable mining truck comprising:
a frame;
a plurality of ground engaging wheels coupled to the frame;
a braking system coupled with the plurality of ground engaging wheels, and having a friction braking mechanism including an electrically actuated valve and a regenerative braking mechanism;
a line connecting mechanism configured to couple the regenerative braking mechanism with an overhead trolley line of an electrical power grid; and
an electronic control unit in control communication with the regenerative braking mechanism and the electrically actuated valve in the braking system, and being configured to receive data indicative of a change in demand for regenerated electrical power in the electrical power grid;

the electronic control unit being further configured to command braking the mining truck via outputting a control command to the electrically actuated valve such that application of a retarding torque on the ground engaging wheels is allocated from the friction braking mechanism to the regenerative braking mechanism in a manner which is responsive to the data.

2. The mining truck of claim 1 wherein the regenerative braking mechanism includes at least one propulsion motor operable in either of a propulsion mode or a retarding mode, and the line connecting mechanism includes a pantograph having an on-trolley configuration for electrically connecting with the overhead trolley line, and a rest configuration.

3. The mining truck of claim 2 wherein the plurality of ground engaging wheels includes a set of back wheels, and the at least one propulsion motor is coupled with the set of back wheels, and wherein the friction braking mechanism includes a front friction braking subsystem and a back friction braking subsystem.

4. The mining truck of claim 2 wherein the data is indicative of an expected change in the demand, and the electronic control unit is further configured to command the braking of the mining truck via outputting a control command to the braking system prior to occurrence of the expected change.

5. The mining truck of claim 1 wherein the electronic control unit is further configured via commanding the braking to transition the mining truck between a first braking mode at which the retarding torque is applied at least predominantly by the friction braking mechanism, and a second braking mode at which the retarding torque is applied at least predominantly by the regenerative braking mechanism.

6. The mining truck of claim 5 wherein the electronic control unit is further configured to determine a value indicative of a desired braking ratio which is commensurate with the change in demand, and to command the braking via outputting a braking control command responsive to the determined value.

7. The mining truck of claim 1 wherein the data is indicative of a change in the magnitude of the demand, and the electronic control unit is further configured via commanding the braking to ramp up or ramp down electrical power fed via the line connecting mechanism to the overhead trolley line.

* * * * *